H. SMITH.
HOG FEEDER.
APPLICATION FILED APR. 14, 1916.
1,190,028. Patented July 4, 1916.
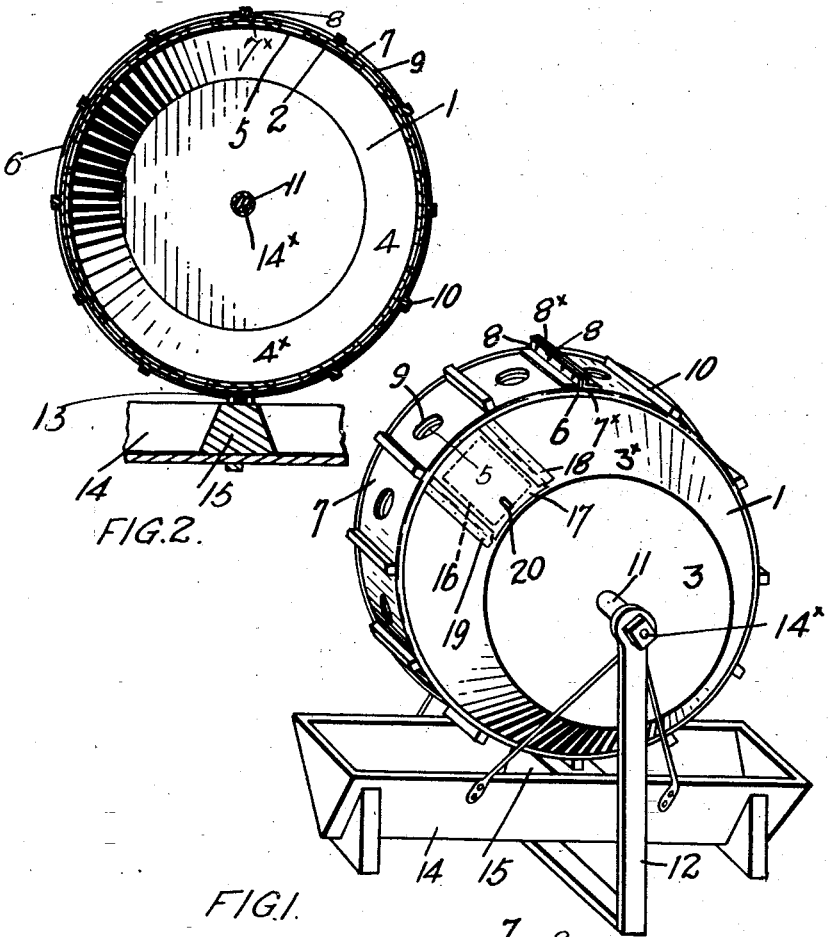
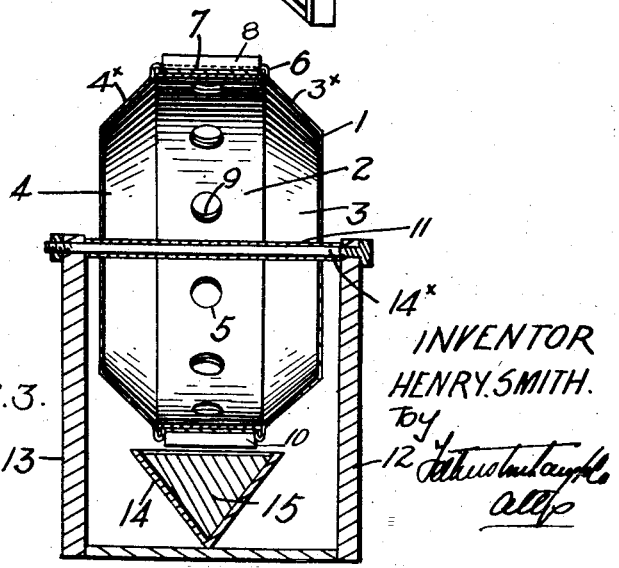
WITNESSES.
C. H. Perry.
INVENTOR
HENRY SMITH.

UNITED STATES PATENT OFFICE.

HENRY SMITH, OF LISTOWEL, ONTARIO, CANADA.

HOG-FEEDER.

1,190,028.  Specification of Letters Patent.  Patented July 4, 1916.

Application filed April 14, 1916. Serial No. 91,108.

*To all whom it may concern:*

Be it known that I, HENRY SMITH, of the town of Listowel, in the county of Perth, in the Province of Ontario, Canada, have invented certain new and useful Improvements in Hog-Feeders, of which the following is the specification.

My invention relates to improvements in hog feeders and the object of the invention is to devise simple means for controlling the amount of feed given to the animal so as to prevent the animal feeding faster than desired by the owners and preventing any danger of the animal gorging itself by grain or other food being fed to it too fast and at the same time insuring that the animal is kept on its feet a sufficient length of time to give it the necessary exercise while obtaining sufficient food to satisfy its hunger and it consists essentially of a feeding receptacle, a drum rotatably mounted above such receptacle and provided with peripheral orifices, means for controlling the size of such orifices, and means carried by the periphery of the drum with which the head of the animal engages to impart free rotary movement to the drum as hereinafter more particularly explained by the following specification.

It is well known particularly with hogs that when feeding they eat their food far too fast and in a short space of time are satisfied and then lie around until the food is digested. By this means they practically get no exercise at all which is necessary to the health of growing hogs. By my device the feed of grain can be so controlled that they only get a small quantity of grain at a time and, therefore, in order to get sufficient they must be kept on their feet for a comparatively long space of time thereby giving them the exercise which they require particularly for young and growing hogs.

When it is necessary to feed hogs for fattening the band may be adjusted so as to open the orifices 5 wide allowing the full flow of grain to pass into the trough. By this means they get their food quickly, get little exercise and, therefore, lie around after their meal as is necessary for fattening purposes.

From this description it will be seen that I have devised a very simple device whereby the amount of food fed to hogs may be controlled so that they cannot obtain more than the amount desired at one time and their feeding spread over a considerable space of time so as to give the animals sufficient exercise to obtain the food necessary to satisfy them.

It will be seen by the employment of my device that only that amount of grain or other food is fed to the animal which he requires and this prevents the animal in feeding throwing around the grain and wasting it which is usually the case when the food is fed to the animal in bulk. My device very greatly reduces the food bill of the owner of the animal and also renders the animal's surroundings much more comfortable by preventing the slopping around of the food.

Figure 1, is a general perspective view of my device, Fig. 2, is a vertical section taken parallel with the face of the drum. Fig. 3, is a cross sectional view taken at right angles to Fig. 2.

In the drawings like letters of reference indicate corresponding parts in each figure.

1 indicates the drum comprising a central annular portion 2 and side portions 3 and 4 having tapered peripheral portions 3$^\times$ and 4$^\times$. The central portion 2 is provided with a series of peripheral orifices 5. The portions 3 and 4 are connected to each side of the portion 2 by a spun flange 6 thereby forming annular rims between which a surrounding band 7 is located. The band 7 is divided at 7$^\times$. To each divided end is secured an angle bar 8 connected together by suitable bolts or other securing means 8$^\times$. The band 7 is provided with a series of orifices 9 corresponding to the orifices 5.

10 indicates a series of cross bars or cleats secured to the band 7 at suitable intervals apart and preferably intermediately between the orifices 9.

11 indicates a tube extending centrally through the drum and to which the side walls of the drum are suitably secured by solder or other means.

12 and 13 indicate supporting standards.

14$^\times$ indicates a bolt extending through the supporting standards and through the tube 11 thereby freely supporting the drum between the standards 12 and 13.

14 indicates a receiving trough provided with a center block 15 located centrally beneath the drum 1, the side walls of the block 15 being slightly inclined outwardly and downwardly as clearly shown in Fig. 2 and the top face formed slightly convex so as to be concentric with the center of the drum 1. The cleats 10, when the drum revolves, pass closely adjacent to the concaved face of the block 15 thereby preventing any grain or other food lodging thereon.

16 indicates the supply orifice by which food is passed into the drum.

17 indicates a cover for closing the supply orifice which may be either a hinged or slidable cover. In the drawing the cover 17 is shown slidably held in guideways 18 and 19 and provided with a handle 20.

Having described the principal parts involved in my invention I will briefly describe the operation of the same. In order to adjust the size of the orifices 5 all that it is necessary to do is to loosen the band 7 and turn it slightly on the drum so that the orifices 9 are more or less in alinement with the orifices 5. The band is then again tightened in position. The drum is filled through the orifice 16. When the animal desires to feed it comes to the trough in search of the food and in moving its head into contact with the drum engages the cross cleats 10 and in quickly raising its head gives the drum a free rotary movement. The grain falls through the orifices 5 into the trough, the amount of grain falling being controlled by the band 7 and orifices 9 as hereinbefore described. If the opening so formed is slight the feed of the grain is very slow and only a small quantity passes into the trough. The animal eats this grain and then in search of more grain again turns the drum thus allowing another supply of grain to pass into the trough. This operation continues until the animal is satisfied.

What I claim as my invention is—

1. A hog feeder comprising a drum freely mounted in suitable bearings and provided with peripheral orifices and a band passing around the exterior periphery of the drum and provided with orifices designed to be brought more or less into alinement with the orifices of the drum, and cross cleats secured at suitable intervals apart to the band.

2. A hog feeder comprising a drum freely mounted in suitable bearings and having peripheral orifices, a split band secured around the periphery of the drum and provided with orifices designed to be brought more or less into alinement with the orifices of the drum, detachable means for securing the ends of the split band together, and means carried by the band with which the head of the animal engages to impart free rotary movement to the drum.

3. In a hog feeder, the combination with the trough having a central block, of a drum freely mounted with its face extending longitudinally of the trough and directly above the central block and having peripheral orifices, and means carried exteriorly of the drum with which the head of the animal engages to impart free rotary movement thereto.

4. In a hog feeder, the combination with the trough having a central block, of a drum freely mounted with its face extending longitudinally of the trough and directly above the central block and having peripheral orifices, and cross cleats carried by the drum with which the head of the animal engages to impart rotary movement thereto and designed to pass in close contact with the upper face of the block of the trough.

5. In a hog feeder, the combination with the trough having a central block having outwardly and downwardly inclined sides and a concaved upper face, of a drum freely mounted with its face extending longitudinally of the trough and directly above the central block and concentric with the concaved upper face of the block and having peripheral orifices, and means carried exteriorly of the drum with which the head of the animal engages to impart free rotary movement thereto.

HENRY SMITH.

Witnesses:
 Geo. Bray,
 W. Hamilton.

Copies of this patent may be obtained for five cents each, by addressing the "Commissioner of Patents, Washington, D. C."